P. H. HERBERT.
OPHTHALMIC MOUNTING.
APPLICATION FILED JAN. 18, 1919.
1,306,540.
Patented June 10, 1919.
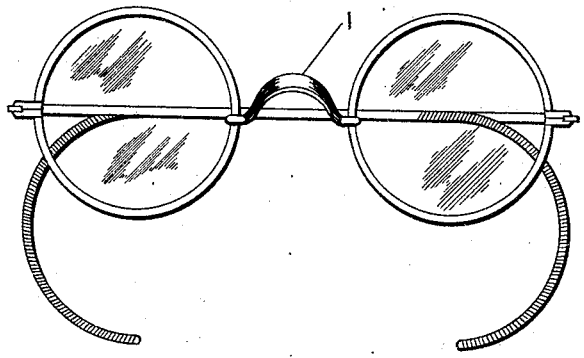
FIG. I
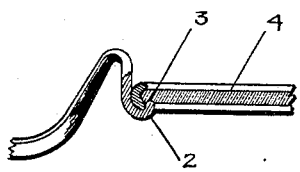
FIG. II
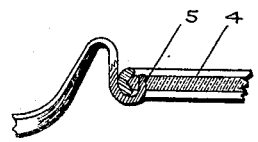
FIG. III
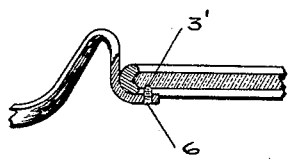
FIG. IV
INVENTOR
PITT. H. HERBERT
BY
H. H. Styll & A. K. Parsons
ATTORNEYS

UNITED STATES PATENT OFFICE.

PITT H. HERBERT, OF SOUTHBRIDGE, MASSACHUSETTS, ASSIGNOR TO THE AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,306,540.  Specification of Letters Patent.  Patented June 10, 1919.

Application filed January 18, 1919. Serial No. 271,792.

*To all whom it may concern:*

Be it known that I, PITT H. HERBERT, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings, and more particularly to spectacles and eyeglasses wherein the lenses are set in suitable frames, the main object of the present invention being the provision of means for engaging the lenses after being set within the frames, whereby to prevent any turning movement of the same.

Another object of the present invention is the provision of means which is formed integral with the spectacle or eyeglass frame and so engages the lens as to prevent any turning movement thereof, and at the same time will be entirely out of the line of vision and not add any unsightly appearance to the frames of the spectacle or eyeglass.

It is a well known fact in the optical art that round lenses which are placed within spectacle or eyeglass frames have a tendency to rotate within the frame and thus change the axis of the lens. As stated above, it is the principal object of my invention to provide means for securely holding the lenses against turning movement after being placed within the frames, and also to provide means which can be formed integral with the frame itself and thus provide for simplicity and reduction in the cost of producing the same.

With the above and other objects in view the invention consists in the novel construction and arrangement of parts hereinafter more fully set forth, pointed out in the claims and shown in the accompanying drawings, in which:

Figure I is a front elevation of a pair of spectacles constructed in accordance with my invention.

Fig. II is a detail transverse sectional view illustrating the preferred manner of embodying my invention.

Fig. III is a slightly modified form of the invention.

Fig. IV is still another form of the invention.

Various ways and means have been adopted in the optical art for holding lenses against turning in spectacle and eyeglass frames, but these means have either added an unsightly appearance to the mounting of the eyeglass or spectacle, or have added considerably to the cost of production of the same, and it is, therefore, the principal object of my invention, as before stated, to not only provide a device which will properly perform the function but will not add materially to the cost of production or provide an unsightly appearance to the frames of the spectacles or eyeglasses.

In carrying out my invention it is preferred to extend the reduced ends of the bridge member 1, as is clearly illustrated in Figs. II, III and IV, and these extended ends can be connected with the lenses in various ways, as illustrated. The preferred manner of attaching the ends of the bridge member to the lenses is clearly illustrated in Fig. II, and in this form of the invention the reduced ends of the bridge are extended around the lens frame and bent at substantially right angles, as illustrated at 2, so that the extreme pointed end thereof will engage within a suitable notch 3 formed in the lens 4, and from this it will be readily apparent that the lenses will be rigidly held against any rotating movement.

In Fig. III, I have illustrated another form of the invention wherein a suitable opening 5 is drilled through the lens 4 and the end of the nose bridge extended through this opening, as illustrated, which will positively prevent any rotation on the part of the lenses. It will be apparent that either of these forms can be used to advantage and the lens provided with only a notch, as illustrated at 3, or drilled with an opening, as illustrated at 5.

In Fig. IV, I have illustrated still another form of the invention, wherein the end of the bridge is extended parallel with the face of the lens, and a set screw 6 extended through the end of the bridge and engaging within the notch 3′ of the lens. This form of the invention is somewhat similar to that of the preferred form illustrated in Fig. II. If it is desired the screw 6 can be set in cement within the opening in the end of the nose bridge so as to positively prevent any removal of the screw until force is applied thereto, thus preventing accidental loss of the screw.

From the above description taken in connection with the accompanying drawings it will be readily apparent that I have provided simple and durable means for securing the lenses within spectacles or eyeglasses, against rotating movement, and have also provided means which do not add any unsightly appearance to the frames of the spectacles, nor add any material difference in the cost of manufacture. The only difference added to the spectacle is the fact that the ends of the nose bridge are drawn out slightly farther than the original form so that these ends can be extended over the edge of the lens frame for engagement with the lens or to provide means whereby the set screw 6 can be engaged with the lens.

I claim:

1. A spectacle or eyeglass, including lens frames, a nose bridge and lenses mounted within the frames, the ends of said nose bridge extending over the frames and engaged with the lenses to prevent rotating movement of the same within the frames.

2. A spectacle or eyeglass including lens frames, a nose bridge and lenses mounted within the frames, the ends of said nose bridge being engaged with the lenses to prevent rotative movement of the same within the frames.

In testimony whereof I have affixed my signature, in presence of two witnesses.

PITT H. HERBERT.

Witnesses:
H. E. COLEMAN,
E. M. LAFLER.

Copies of this patent may be obtained for five cents each, by addressing the "Commissioner of Patents, Washington, D. C."